United States Patent [19]

Oberthür

[11] 4,198,099
[45] Apr. 15, 1980

[54] BRAKING PRESSURE CONTROL UNIT FOR VEHICULAR HYDRAULIC BRAKE SYSTEMS

[75] Inventor: Heinrich Oberthür, Offenbach-Rumpenheim, Fed. Rep. of Germany

[73] Assignee: ITT Industries, Incorporated, New York, N.Y.

[21] Appl. No.: 944,056

[22] Filed: Sep. 20, 1978

[30] Foreign Application Priority Data

Oct. 3, 1977 [DE] Fed. Rep. of Germany ....... 2744407

[51] Int. Cl.² .............................................. B60T 8/26
[52] U.S. Cl. .................................. 303/6 C; 303/22 R
[58] Field of Search .................. 137/87; 188/345, 349, 188/195; 303/6 R, 6 C, 22 R, 52, 84 R, 84 A, 22 A

[56] References Cited

U.S. PATENT DOCUMENTS

| 3,973,578 | 8/1976 | Heibel et al. ..................... 303/6 C X |
| 4,025,123 | 5/1977 | Oberthuer ..................... 303/22 R X |
| 4,053,185 | 10/1977 | Carré ..................................... 303/6 C |
| 4,053,186 | 10/1977 | Jakobi ........................... 303/22 R X |
| 4,071,281 | 1/1978 | Nogami ........................... 303/6 C X |

FOREIGN PATENT DOCUMENTS

2236294 2/1974 Fed. Rep. of Germany .

*Primary Examiner*—Douglas C. Butler
*Attorney, Agent, or Firm*—John T. O'Halloran; Alfred C. Hill

[57] ABSTRACT

A braking pressure control unit for use on vehicles provides for dual-circuit braking of the rear axle. The braking pressure control unit comprises a braking force reducer including a stepped piston and a braking force limiter disposed coaxially and in series therewith. The closing member of the limiter bears directly against the stepped piston while the closing member of the reducer bears, in the rest position, against a stop independent of the limiter. As a result, the change-over point in one brake circuit will not change in the event of failure of the other brake circuit.

8 Claims, 1 Drawing Figure

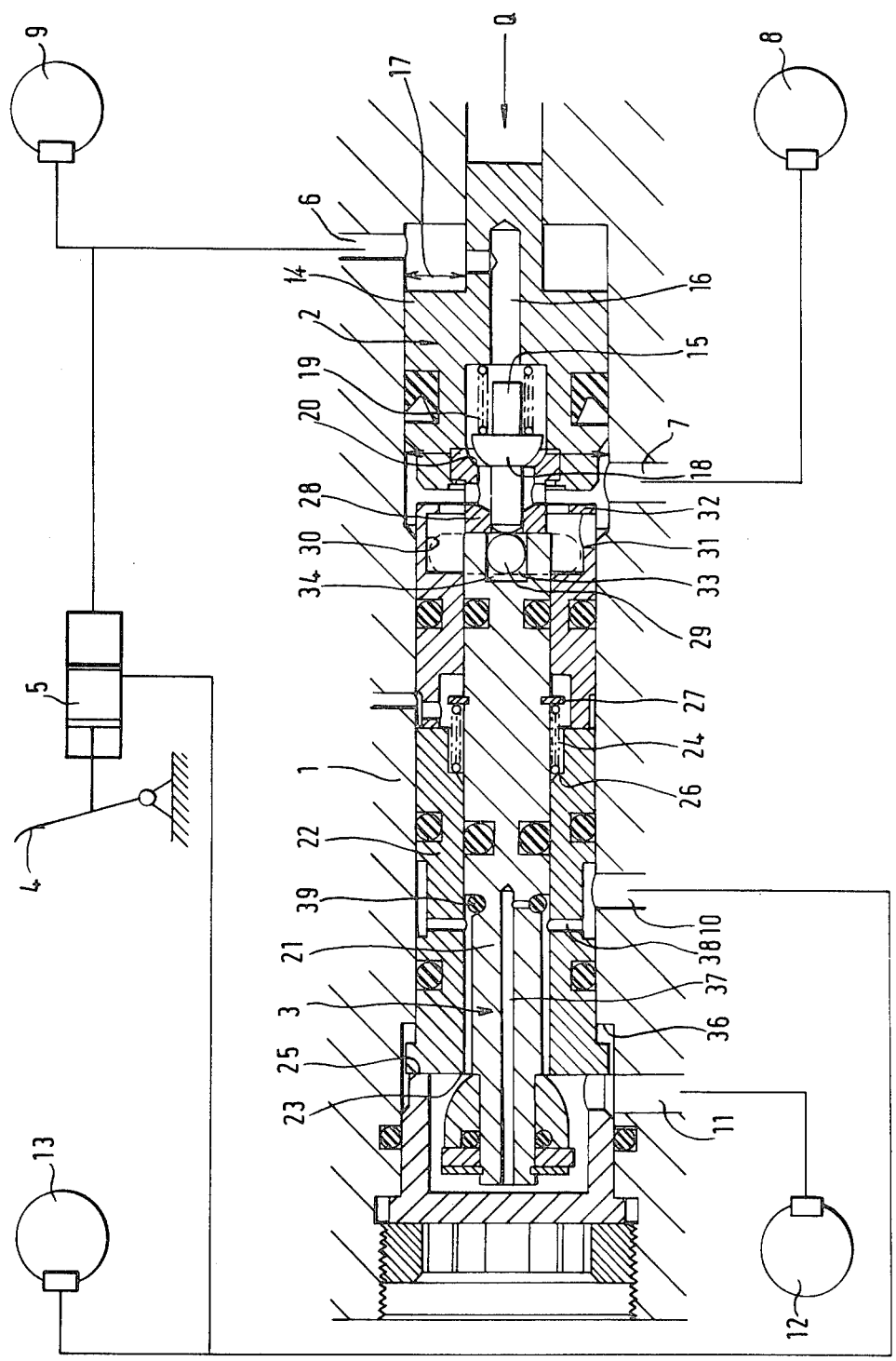

BRAKING PRESSURE CONTROL UNIT FOR VEHICULAR HYDRAULIC BRAKE SYSTEMS

BACKGROUND OF THE INVENTION

The present invention relates to a braking pressure control unit for vehicular hydraulic brake systems in which the brakes at the rear wheels of the vehicle are pressurized by two separate brake circuits. The control unit is formed by two pressure control valves coaxially arranged in series and each controlling the pressure medium connection between the pressure medium source and the wheel brake cylinders of one brake circuit, one pressure control valve being designed as a braking force reducer provided with a stepped piston and the other pressure control valve being designed as a braking force limiter.

Such a braking pressure control unit is described in German Pat. No. 2,236,294. In the braking pressure control unit described in this patent, both the closing member of the braking force reducer and the closing member of the opposite braking force limiter are supported by an intermediary piston. Upon pressurization of the braking force reducer, the stepped piston starts moving against its control force and will at first continue to do so until the closing distance of the closing member of the braking force reducer has been travelled. As soon as the braking force reducer closing member is closed, the intermediary piston will move towards the braking force reducer upon a further pressure increase since, on the side of the braking force limiter, the intermediary piston is acted upon by increasing pressure, while, on the side of the braking force reducer, the intermediary piston is acted upon by constant pressure. A state of balance is achieved in that the intermediary piston is permanently pushing the closing member of the braking force reducer back into its open position. In doing so, the intermediary piston is following the movement of the stepped piston. The intermediary piston will cease to follow the further displacement of the stepped piston of the braking force reducer only after the braking force reducer has travelled the closing distance of the closing member of the braking force limiter in addition to the closing distance of its own closing member, both closing members then being closed. Now, the phase of pressure reduction will be starting in both brake circuits.

Upon failure of either brake circuit caused by a defect, the displacement of the stepped piston by the amount of the closing distance of but one closing member will be sufficient to cause the closing member of the intact brake circuit to close.

Due to the reduction of the displacement distance by one half, the control force will correspondingly be smaller than in the case of the fully available displacement distance as a result of which the braking force will be reduced considerably upon the closure of the closing member of the intact brake circuit. This, however, is highly undesirable. If one brake circuit fails, it is desired to get at least the maximum available braking force out of the remaining brake circuit.

SUMMARY OF THE INVENTION

An object of the present invention is to provide a braking pressure control unit of the type referred to above which ensures that the displacement distances until the closure of the closing member(s) in the operable brake circuit will always be the same, both in the event of proper functioning and in the event of failure of either of the two circuits.

Another object of the present invention is to provide a braking pressure control unit which ensures that in the event of failure of the braking force reducer the closing distance of the braking force limiter closing member will automatically enlarge as a result of which the building-up of pressure in the still operable brake circuit will even be higher than in the event of both brake circuits functioning.

A feature of the present invention is the provision of a braking pressure control unit for vehicular hydraulic brake systems in which brakes at rear wheels of a vehicle are pressurized by two separate brake circuits comprising: a first pressure control valve having a longitudinal axis controlling a first pressure medium connection between a pressure medium source and one of the two brake circuits, the first valve including a stepped piston and a first closing member disposed internally of the stepped piston and coaxial of the axis; a second pressure control valve disposed coaxial of the axis, in series with the stepped piston and adjacent the first closing member, the second valve controlling a second pressure medium connection between the source and the other of the two brake circuits, the second valve including a second closing member coaxial of the axis and supported by the stepped piston; and a stop disposed in the second valve and abutting the first closing member to keep the first closing member in its open position when the unit is in its rest position.

The advantages of the braking pressure control unit of the present invention are primarily the fact that, upon a displacement of the stepped piston, the closing member of the braking force limiter will directly follow this movement. The stepped piston, therefore, only needs to travel the closing distance of its own closing member in order to also bring about a closing of the braking force limiter. This measure ensures that no reduction of the displacement distance of the stepped piston will take place even in the event of failure of either brake circuit. In the remaining brake circuit, therefore, pressure will be built up the same as if both brake circuits were functioning. The inventive braking pressure control unit thus allows shorter braking distances upon the failure of a brake circuit than does the braking pressure control unit of the above-cited German Pat. No. 2,236,294.

Another feature of the present invention is that the valve seat of the braking force limiter is formed by an axially displaceable sleeve, which, on one side thereof is pressurized by the pressure of one brake circuit and, which, on the other side thereof, is pressurized by the pressure of the other brake circuit.

Due to this design, the sleeve will move by a certain amount upon the failure of the brake circuit associated with the braking force reducer. Therefore, the closing member of the braking force limiter has to travel a longer closing distance and, consequently, displace the stepped piston of the braking force reducer further against the control force. Thus, the braking force limiter will only close on a higher pressure level. If one brake circuit fails, a braking pressure control unit of this design will allow the building-up of a pressure in the still operable rear wheel brake circuit which exceeds that achieved in the event of both brake circuits operability. This will lead to a further reduction of the braking distance. There is no danger of overbraking of the rear wheel brake since, due to the failure of one brake circuit, the vehicular deceleration possible at the maximum will diminish. Consequently, less weight is shifted from the rear axle to the front axle during the braking operation.

The braking pressure control unit of the present invention is simple in design and, consequently inexpensive in manufacture. The simplicity of the design will also enhance the reliability of the inventive braking pressure control unit.

BRIEF DESCRIPTION OF THE DRAWING

The above-mentioned and other features and objects of the present invention and the manner of obtaining them will become more apparent by the reference to the following description taken in conjunction with the drawing, the single FIGURE of which is a longitudinal cross-sectional view of the braking pressure control unit in accordance with the principles of the present invention.

DESCRIPTION OF THE PREFERRED EMBODIMENT

The braking pressure control unit illustrated in the FIGURE includes a braking force reducer 2 and a braking force limiter 3 in a common housing 1. Upon actuation of a brake pedal 4, pressure medium is supplied from a two-circuit master cylinder 5 to a rear wheel brake 8 via an inlet 6, via the braking force reducer 2 and via an outlet 7. At the same time, this brake circuit is communicating with, e.g., a front wheel brake 9. The second brake circuit of the master cylinder 5 supplies pressure medium to the braking force limiter 3 via an inlet 10 and to a rear wheel brake 12 via an outlet 11. At the same time, this brake circuit is pressurizing a further front wheel brake 13.

The braking force reducer 2 is provided with a stepped piston 14 having a pressure medium passage 16 controlled by a closing member 15. The pressure supplied from the inlet 6 acts on an annular surface 17 while the pressure on the side of the outlet 7 acts upon a larger circular surface 18. In consequence, the stepped piston 14 will be displaced against a control force Q as the pressure increases. A spring 19 will then push the closing member 15 against a valve seat 20 of the stepped piston 14. Thanks to this action it is possible to interrupt the communication from the master cylinder 5 to the rear wheel brake 8.

The braking force limiter 3 includes a closing member 21 which is axially and sealably displaceable in a sleeve 22. Sleeve 22 forms a valve seat 23 for the closing member 21 and is axially displaceable in the housing 1 up to a shoulder 36 of the housing 1. However, in the rest position, sleeve 22 is held against a stationary abutment 25 by means of a pressure spring 24. To this end, the pressure spring 24 is held between a shoulder 26 of the sleeve 22 and an abutment 27 of the closing member 21. The closing member 21, on its part, abuts against a projection 28 of the stepped piston 14.

Since, in the rest position, the closing member 15 of the braking force reducer 2 must be lifted from the valve seat 20, a pin 29 is provided in the sleeve 22 abutted by the closing member 15. In the drawing, pin 29 is represented by a dotted line, turned by 90 degrees, in order to illustrate its location more clearly. The pin 29 is inserted into a front face annular chamber 30 of the sleeve 22. In order to enable this insertion, the sleeve 22 is provided with a hole 31 in the range of the annular chamber 30. A shoulder 32 closes off the annular chamber 30 in order to prevent the pin 29 from leaving the annular chamber 30. The closing member 21 of the braking force limiter 3 is provided with a slot 33 adjacent the braking force reducer 2, slot 33 being open on the front face and the pin 29 being passed through it. Slot 33 is dimensioned deep enough to ensure that a play 34 is formed between the pin 29 and the end of the slot 33, play 34 at least equalling the closing distance of the closing member 21.

A pressure medium connection is provided in the closing member 21 by means of an axial bore 37, a radial bore 38 and an annular seal 39, the pressure medium connection leading from the outlet 11 to the inlet 10 and blocked in the reverse direction.

The described braking pressure control unit works as follows: At first it is assumed that both brake circuits will be operating. Upon a downward movement of the brake pedal 4, pressure medium will be passed to the inlets 6 and 10 by means of the master cylinder 5. The pressure supplied to the inlet 6 will act upon the annular surface 17. The pressure medium will pass through the pressure medium passage 16 of the stepped piston 14, along the valve seat 20, to the outlet 7 and then to the rear wheel brake 8. In consequence, the circular surface 18 will be pressurized. Since this circular surface 18 is larger than the annular surface 17, the stepped piston 14 will move against the control force Q, to the right, as viewed in the drawing.

Via the valve seat 23, the pressure supplied to the inlet 10 will be passed to the outlet 11 and then to the other rear wheel brake 12. Since the closing member 21 of the braking force limiter 3 is directly supported by the stepped piston 14 it will follow the movement of the stepped piston 14, propelled by the force of the spring 24. As a result, the closing member 21 of the braking force limiter 3 and the closing member 15 of the braking force reducer 2 will simultaneously come into the closed position. The stepped piston 14 only needs to move by an amount equalling the closing distance of its own closing member 15 in order to simultaneously cause the closing member 21 of the braking force limiter 3 to close.

Now it is assumed that the brake circuit associated with the braking force reducer 2 has failed. The pressure supplied to the inlet 10 will act on the valve-seat-side front face of the sleeve 22 after having passed the valve seat 23. Sleeve 22 will move to the right, as viewed in the drawing, since it ceases to be pressurized on its opposite side due to the failure of the other brake circuit. The closing member 21 will also move to the right, as viewed in the drawing, against the control force Q. In order to be seated on the valve seat 23, however, the closing member need not just travel its usual closing distance but, in addition, the distance travelled by the sleeve 22. Consequently, it will only close if a pressure is achieved which exceeds that achieved if both brake circuits were functioning. Thus, upon failure of the brake circuit associated with the braking force reducer 2, a higher pressure can be built up by means of the still operable rear wheel brake circuit than in the case of both rear wheel brakes operability.

However, upon a failure of the brake circuit associated with the braking force limiter 3, the stepped piston 14 must be displaced by its normal closing distance until the closing member 15 will close for the first time. The pressure acting on the annular surface 17, however, will again and again cause the closing member 15 to open for a short time so as to enable the further building-up of a limited pressure in the rear wheel brake 8 in correspondence with the surface ratio between the annular surface 17 and the circular surface 18.

While I have described above the principles of my invention in connection with specific apparatus it is to be clearly understood that this description is made only by way of example and not as a limitation to the scope of my invention as set forth in the objects thereof and in the accompanying claims.

I claim:

1. A braking pressure control unit for vehicular hydraulic brake systems in which brakes at rear wheels of a vehicle are pressurized by two separate brake circuits comprising:
   a first pressure control valve having a longitudinal axis controlling a first pressure medium connection between a pressure medium source and one of said two brake circuits, said first valve including a stepped piston and a first closing member disposed internally of said stepped piston and coaxial of said axis;
   a second pressure control valve disposed coaxial of said axis, in series with said stepped piston and adjacent said first closing member, said second valve controlling a second pressure medium connection between said source and the other of said two brake circuits, said second valve including a second closing member coaxial of said axis and supported by said stepped piston; and
   a stop disposed internally of said second valve and abutting said first closing member to keep said first closing member in its open position when said unit is in its rest position.

2. A unit according to claim 1, wherein said second valve further includes
   a sleeve disposed coaxial of said axis and surrounding said second closing member in an axially slidable sealed relation with said second closing member, said sleeve providing on one end thereof remote from said stepped piston a valve seat for said second closing member, said one end of said sleeve being pressurized by the pressure of said other of said two brake circuits and the other end of said sleeve being pressurized by said one of said two brake circuits.

3. A unit according to claim 2, wherein
said sleeve is held against a first abutment adjacent said one end of said sleeve by a pressure spring when said unit is in its rest position.

4. A unit according to claim 3, wherein
said pressure spring is disposed between a shoulder on the inner surface of said sleeve and a second abutment on the outer surface of said second closing member.

5. A unit according to claim 4, wherein
said stop is a pin held radially in said other end of said sleeve adjacent said first closing member; and further including
   a slot in said second closing member adjacent said other end of said sleeve and open toward said first closing member to receive said pin; and
   an axial play in said slot for said pin, said play, at the minimum being equal to the closing distance of said second closing member.

6. A unit according to claim 5, wherein
said pin is also disposed in an annular chamber adjacent said other end of said sleeve, and
a radial slot is provided in said sleeve adjacent said annular chamber through which said pin is inserted for placing in said annular chamber.

7. A unit according to claim 3, wherein
said stop is a pin held radially in said other end of said sleeve adjacent said first closing member; and further including
   a slot in said second closing member adjacent said other end of said sleeve and open toward said first closing member to receive said pin; and
   an axial play in said slot for said pin, said play at the minimum being equal to the closing distance of said second closing member.

8. A unit according to claim 7, wherein
said pin is also disposed in an annular chamber adjacent said other end of said sleeve, and
a radial slot is provided in said sleeve adjacent said annular chamber through which said pin is inserted for placing in said annular chamber.

* * * * *